D. COHEN.
TIRE PLUG.
APPLICATION FILED JAN. 15, 1921.

1,411,411.

Patented Apr. 4, 1922.

D. Cohen INVENTOR.

BY
Mason Fenwick Lawrence
ATTORNEYS

UNITED STATES PATENT OFFICE.

DAN COHEN, OF MEMPHIS, TENNESSEE.

TIRE PLUG.

1,411,411. Specification of Letters Patent. Patented Apr. 4, 1922.

Application filed January 15, 1921. Serial No. 437,553.

*To all whom it may concern:*

Be it known that I, DAN COHEN, a citizen of the United States, residing at Memphis, in the county of Shelby and State of Tennessee, have invented certain new and useful Improvements in Tire Plugs; and I do hereby declare the following to be a full, clear, and exact description of the invention, such as will enable others skilled in the art to which it appertains to make and use the same.

This invention relates to new and useful improvements in tire plugs and more particularly to a plug adapted to be used on pneumatic vehicle tires for closing a puncture or small blowout in the tire, the main object of the present invention being the provision of a tire plug which can be quickly and readily applied to a pneumatic tire for closing a puncture and thus eliminate the necessity of having the same vulcanized or the use of the usual well known adhesive patches in use at the present time.

Another object of this invention is the provision of a tire plug whereby means is provided for inserting the plug into the tire through the puncture and arranging the same in position to entirely close the puncture, the means for inserting the plug being removed so that the puncture will be quickly mended and a smooth and unbroken surface to the exterior of the tire.

A further object of this invention is the provision of a tire plug having means whereby the plug can be quickly and readily inserted into the tire through the puncture opening and the means for guiding the plug through the puncture readily removed from the inner end thereof after the plug has passed into the tire through the puncture.

With the above and other objects in view the invention consists in the novel features of construction, combination and arrangement of parts hereinafter more fully set forth, pointed out in the claims and shown in the accompanying drawings in which:

Figure 1:
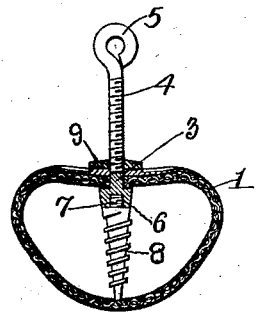
Figure 1 is a transverse sectional view taken through a pneumatic tire illustrating my improved plug in position and a guiding member about to be removed from the plug.

Referring now more particularly to the drawings the numeral 1 indicates the body portion of a pneumatic vehicle tire and in Fig. 1 the plug has been illustrated as shown in position with respect to the puncture in the tire body, the guiding member being in a position whereby the same can be readily removed from the inner end of the plug.

Figure 2:
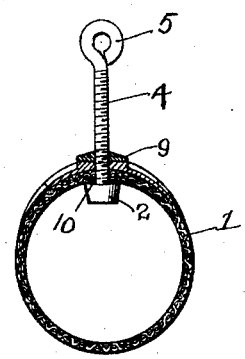
Fig. 2 is a similar view showing the guiding member removed and the clamping nut down in position against the tread of the tire.

In the construction of the plug, I provide the clamping body 2 preferably cylindrical in form as clearly illustrated in Fig. 2 and having a stem 3 projecting from one face thereof and preferably screw threaded as shown at 4, the outer end of said stem being provided with an eye 5 whereby any suitable instrument may be inserted through the eye for rotating the plug and stem when desired.

The inner end of the plug body 2 is provided with an internally threaded bore 6 adapted to receive a threaded stem 7 formed upon the inner end of a tapering screw member 8. It will be noted in the drawings that the stem 7 is comparatively short and only sufficient screw threads are necessary to hold the screw member 8 in position with respect to the outer end of the plug 2 until the screw member 8 and plug 2 are arranged upon the interior of the tire body 2.

Figure 3:
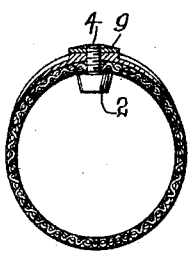
Fig. 3 is a similar view showing the plug in its finished state.

In applying my improved plug to a puncture in a pneumatic tire body the pointed end of the screw member 8 is inserted into the puncture opening and the stem 4 turned so that the screw member 8 will force its way through the tire body, carrying the plug 2 with it. This operation is continued until the screw member 8 and the plug 2 are disposed entirely within the body of the tire. The tire is then depressed until the outer end of the screw member 8 engages the opposite side wall, the stem 4 is then rotated backwardly in order to unscrew the screw member 8 from its connection with the plug body 2. The clamping washer 9 is then screwed downwardly upon the stem 4 with the hand until it engages the outer surface of the tire. The stem 4 is then rotated so as to bring the clamping washer 9 and the plug body 2 toward each other and if necessary a small tool can be inserted through the eye 5 to readily accomplish this turning movement of the stem. After the clamping washer 9 and the plug body 2 have been forced into tight engagement with opposite sides of the tire body, the stem 4 is then cut off even with the outer surface of the washer 9 as illustrated in Fig. 3 to provide a smooth and unbroken finish to the outer surface of the tire.

It will be noted that the upper face of the plug body 2 is provided with a concave surface indicated at 10, portions of the tire body being forced into this concavity so as to insure the tight closing of the puncture opening when the plug 2 and the washer 4 are forced toward each other through the turning movement of the stem 4.

Figure 4:
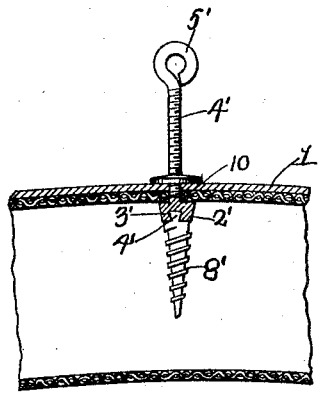
Fig. 4 is a longitudinal sectional view of a tire illustrating a slightly modified form of the plug.

In Fig. 4 I have illustrated a slightly modified form of the invention wherein the outer end of the plug body 2' is provided with a transverse groove 3' having inclined side walls and adapted to receive the dove-tailed lug 4' formed upon the inner end of the screw member 8'. From this it will be apparent that when the screw member 8' is being passed through the body of the tire, it will be readily rotated through the movement of the stem 4' and when the body 2' and screw member 8' have been passed entirely into the body of the tire, the screw member 8' can be readily removed by laying the tire upon its side and jarring the screw member 8' loose from its connection with the plug 2'. In the construction of this form of the invention it will be preferred to have the dove-tailed connection extending at right angles to the eye 5' so that the operator will readily know when the screw member is in a position so that the same can be readily jarred loose from its connection with the plug 2'.

Figure 5:
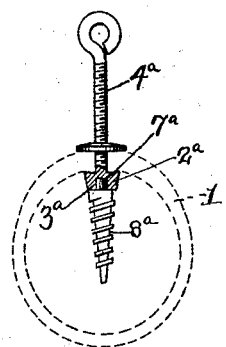
Fig. 5 is an elevation, parts broken away and in section, the tire being illustrated in dotted lines.

In Fig. 5 I have illustrated another form of the invention wherein the plug body $2^a$ is provided with a straight transverse opening $3^a$ and the inner end of the screw member $8^a$ is provided with an elongated plug $7^a$ adapted to be inserted within the opening $3^a$ so that the screw member $8^a$ can be readily rotated through the medium of the stem $4^a$ when engaged with the puncture opening in the tire body. The rotation of stem $4^a$ will rotate the screw $8^a$ so that the same will readily pass through the body of the tire to the interior thereof and from this it will be apparent that after the screw $8^a$ has reached the interior of the tire, a slight jarring upon the tire body will readily shake the screw $8^a$ from its connection with the plug $2^a$ and permit the screw member $8^a$ to drop into the tire body. In using the various types of cone plugs at the present time, the plugs remain attached to the stem thus having the plug protruding into the inner tire so that when a new puncture occurs and the tire necessarily becomes flat, the protruding cone will injure the other side of the tire, whereas in the present instance, the cone is detached from the plug and remains inside the tire where it will do no harm.

I wish it to be understood that while I have shown and described various means of connecting the guiding screw member with the plug body, various other types of connections can be used so that the screw member will be readily released from the plug body after the screw has guided the plug through the puncture opening in the tire, but the main feature of my invention is the fact that the guiding screw can be quickly and readily detached from the inner end of the plug after its use has been carried out in guiding the plug through the puncture in the tire body of the tire.

I claim as my invention:

1. A device of the class described including a plug, a threaded stem formed integral therewith, a guiding screw detachably connected to the plug in opposed relation with the stem, and a clamping washer threaded upon the stem as and for the purpose set forth.

2. A device of the class described including a plug member having a threaded stem, a guiding screw detachably connected with the plug in opposed relation with respect to the stem whereby to guide the plug through a puncture opening in a pneumatic tire, said guide screw being removable when disposed upon the interior of the tire, and a clamping member threaded upon the stem in opposed relation with the plug.

3. A device of the class described including a plug member, a threaded stem formed on the plug, a detachable guiding screw carried by the plug and arranged in opposed relation with the stem whereby to guide the plug through a puncture opening in a pneumatic tube, and a clamping washer threaded upon the stem and arranged in opposed relation with the plug, said stem being severed at a point parallel with the outer face of the washer after the washer has been screwed down tightly against the outer surface of the tube.

4. A device of the class described including a plug member, a guiding screw detachably connected with one end thereof, a stem formed integral with the plug and projecting in opposed relation with the screw, a clamping washer threaded upon the stem whereby the rotation of the stem will bring the clamping washer and plug toward each other to clamp portions of a tube disposed between the same and said stem being severed flush with the outer face of the washer after the two members have been brought into clamping engagement with the tire body.

In testimony whereof I affix my signature.

DAN COHEN.